United States Patent [19]
Oda et al.

[11] 3,927,887
[45] Dec. 23, 1975

[54] RECORD STYLUS

[75] Inventors: Fujio Oda, Ashiya; Hiroshi Otani, Shijonawate, both of Japan

[73] Assignee: Matsushita Electric Industrial Co., Ltd., Osaka, Japan

[22] Filed: Dec. 26, 1973

[21] Appl. No.: 427,691

[30] Foreign Application Priority Data

| | | |
|---|---|---|
| Dec. 28, 1972 | Japan | 47-3438 |
| Dec. 28, 1972 | Japan | 47-3439 |
| Dec. 28, 1972 | Japan | 47-3440 |

[52] U.S. Cl. .................... 274/38
[51] Int. Cl.² .................... G11B 3/44
[58] Field of Search .................... 274/38

[56] References Cited

UNITED STATES PATENTS

| | | | |
|---|---|---|---|
| 2,519,488 | 8/1950 | Mack | 274/38 |
| 2,583,289 | 1/1952 | Bauer | 274/38 |
| 2,625,401 | 1/1953 | Frederick | 274/38 |
| 2,803,738 | 8/1957 | Glenn | 274/38 X |
| 3,534,968 | 10/1970 | Puleston | 274/38 |

FOREIGN PATENTS OR APPLICATIONS

| | | | |
|---|---|---|---|
| 329,005 | 5/1930 | United Kingdom | 274/38 |
| 557,117 | 11/1943 | United Kingdom | 274/38 |

*Primary Examiner*—Richard E. Aegerter
*Assistant Examiner*—Charles E. Phillips
*Attorney, Agent, or Firm*—Stevens, Davis, Miller & Mosher

[57] ABSTRACT

A record stylus comprising a stylus substrate having a surface coated with a film of silicon carbide or boron carbide thereon has a smooth and hard surface, a high wear resistance and a long life and is light and excellent in physical characteristics. Furthermore, this stylus is inexpensive.

3 Claims, 5 Drawing Figures

RECORD STYLUS

The present invention relates to a record stylus for playing back disk records.

Conventionally, record styluses for playing back disk records are produced by abrading and polishing a hard crystal material such as sapphire or diamond into a stylus. Especially, as a stylus for high-class stereophonic reproduction devices, diamond styluses are mainly used because reproduction characteristics are important and so it is required that the stylus have a tip of small radius, be light in weight and have a long life. However, it is very difficult to smooth the surface of diamond and to work with accuracy at sizes such as the radius of a tip. Therefore, production of diamond styluses is expensive.

Furthermore, recently, record styluses having tips worked into elliptic form have been desired. Moreover, styluses have been demanded which are smaller size and lighter in weight. Thus, diamond styluses become more and more expensive. It is also difficult to completely polish the surface of diamond stylus. Therefore, the surface lacks smoothness and damage to the disk grooves often results.

The sapphire styluses are inexpensive and can easily be worked, but are insufficient in wear resistance and do not provide long life. Thus, the diamond styluses and sapphire styluses have respective defects.

The object of the present invention is to provide inexpensive record styluses which have a smooth and hard surface, high wear resistance, long life, light weight, excellent physical characteristics and which can be easily produced.

The record styluses of the present invention will be described below.

The record styluses of the present invention are produced by forming a thin film of silicon carbide (SiC) or boron carbide ($B_4C$) on the surface of a desired material and said film may be formed, e.g., by the high frequency sputtering technique. That is, silicon carbide or boron carbide as an electrode and a substrate for the stylus are placed at an interval of several centimeters in a low pressure inert gas such as argon, and said silicon carbide or boron carbide is evaporated and deposited on the surface of said substrate to form a film thereon by high frequency discharge.

The film of silicon carbide and boron carbide has a diamond crystal structure and is excellent in physical characteristics, namely, it has high wear resistance and thermal conductivity nearly equal to that of diamond. Thus, it becomes possible to improve the characteristics of record styluses as mentioned below.

Figure 1:
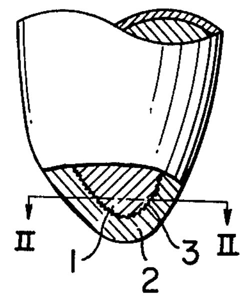
FIG. 1 is a sectional side view of an essential part of one embodiment of the present record stylus.

In FIG. 1, film 2 of silicon carbide is formed on the surface of substrate 1 of the usual diamond stylus and fine irregularities 3 on the surface of the diamond are filled with silicon carbide to form a smooth surface, to prolong its life and to greatly decrease damage to the grooves of a disk record.

Figure 3:
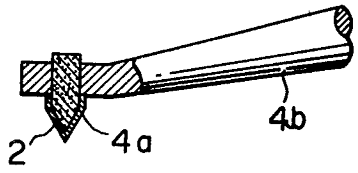
FIG. 3–5 are sectional side views of an essential part of embodiments of the present invention which comprises the record stylus mounted on a supporting cantilevered, arm in which 2 is a film of silicon carbide, 4*a* is a stylus substrate and 4*b* is the cantilevered arm.

In FIG. 3, a hole is bored in cantilevered arms 4b, in which the stylus 4*a* is inserted and is allowed to adhere to the cantilevered arm.

A film silicon carbide is stronger than sapphire ($Al_2O_3$) and therefore, when said film is formed on the surface of a sapphire stylus substrate, a record stylus which has a long life, is inexpensive and is excellent in reproduction characteristics can be obtained.

Moreover, when a film of silicon carbide is formed on the surface of a light metal such as titanium or duralumin, a light record stylus having a long life can be obtained at low cost without a complicated abrading operation.

Figure 4:
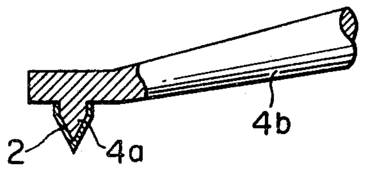
Figure 5:
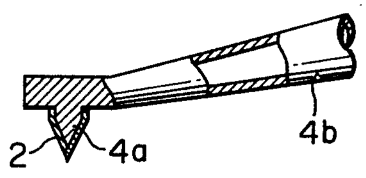

In this case, furthermore, a light record stylus with excellent reproduction characteristics can be obtained by molding stylus substrate 4*a* and cantilever 4*b* as an integral body as shown in FIGS. 4 and 5. In this case, when cantilevered arm 4*b* is in a pipe form as shown in FIG. 5, the weight of the stylus can be further lightened.

Figure 2:
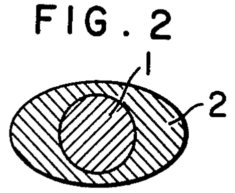
FIG. 2 is a cross-sectional view of the record stylus shown in FIG. 1 at II—II.

In high frequency sputtering, growth speed and growth direction of the film can be controlled to some extent. Therefore, as shown in FIG. 2, the tip of the stylus can be made elliptic by changing the thickness of the film in forming silicon carbide 2 on the stylus substrate 1 having the usual circular tip portion. Thus, an elliptic stylus having a smooth surface can be produced at a low cost without a complicated abrading process such as elliptic abrasion.

It has been experimentally determined that sufficient strength can be obtained when the thickness of the silicon carbide film is $2\mu$ or more, and preferably $2–20\mu$. In this embodiment, a thin film of silicon carbide is used, but it has been confirmed by experiment that a thin film of boron carbide ($B_4C$) can also provide the same effect as mentioned above. Furthermore, cantiguans layers of silicon carbide and boron carbide may also be used in the present invention.

What is claimed is:

1. A record stylus comprising a supporting arm; a diamond substrate secured to an end of said supporting arm; and a thin film selected from the group consisting of silicon carbide and boron carbide formed on the surface of said diamond substrate to provide a smooth surface on said diamond substrate.

2. A record stylus according to claim 1, wherein the thickness of said film is in the range $2–20\mu$.

3. A record stylus according to claim 1, wherein the outer surface of said film is in an elliptical form at cross section.

* * * * *